United States Patent
Bittner et al.

(10) Patent No.: US 10,183,542 B1
(45) Date of Patent: Jan. 22, 2019

(54) SUSPENSION CONTROL SYSTEM PROVIDING ORIENTATION CONTROL FOR AN AGRICULTURAL MACHINE

(71) Applicant: CNH Industrial America LLC, New Holland, PA (US)

(72) Inventors: Roy A. Bittner, Cato, WI (US); Blaine A. Schwalbe, Valders, WI (US); Nathan P. Brooks, Manitowoc, WI (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/837,412

(22) Filed: Dec. 11, 2017

(51) Int. Cl.
*B60G 17/0165* (2006.01)
*A01G 25/09* (2006.01)
(Continued)

(52) U.S. Cl.
CPC ........ *B60G 17/0165* (2013.01); *A01C 23/047* (2013.01); *A01G 25/09* (2013.01); *A01M 7/0042* (2013.01); *B05B 13/005* (2013.01); *B60G 2300/08* (2013.01); *B60G 2300/083* (2013.01); *B60G 2400/0511* (2013.01);
(Continued)

(58) Field of Classification Search
CPC ............ B60G 17/0165; B60G 2600/14; B60G 2600/182; B60G 2500/30; B60G 2400/252; B60G 2400/41; B60G 2800/014; B60G 2400/0522; B60G 2400/0511; B60G 2300/08; B60G 2300/083; B60G 2800/012; B60G 2600/17; B60G 2600/16; B60G 2800/914; B60G 2400/204; A01G 25/09; B05B 13/005; A01M 7/0042; A01C 23/047
See application file for complete search history.

(56) References Cited

U.S. PATENT DOCUMENTS 3,754,383 A * 8/1973 Burrough ............. A01D 43/107
280/43
5,231,583 A 7/1993 Lizell
(Continued)

FOREIGN PATENT DOCUMENTS

| CN | 205030071 U | 2/2016 |
|---|---|---|
| GB | 2311967 A | 10/1997 |
| WO | 2009053081 A1 | 4/2009 |

OTHER PUBLICATIONS

Goldacres: G4V Crop Cruiser Overview; http://www.goldacres.com.au/crop-cruiser-self-propelled-g4v—Nov. 22, 2017—(21) pages.

*Primary Examiner* — Russell Frejd
(74) *Attorney, Agent, or Firm* — Rebecca L. Henkel; Rickard K. DeMille

(57) ABSTRACT

One or more vehicle sensors can be used in a suspension control system of an agricultural machine to dynamically adjust pistons located proximal to wheels of the machine to substantially control orientation. Such vehicle sensors could include: a speed sensor configured to provide an output indicating a speed of the machine; a turn angle sensor configured to provide an output indicating a turn angle of the machine; and/or an Inertial Measurement Unit (IMU) configured to detect a chassis-to-horizon angle. The output can be compared to a threshold for determining when to control valves in the suspension system to apply height corrections.

20 Claims, 10 Drawing Sheets

(51) Int. Cl.
*B05B 13/00* (2006.01)
*A01M 7/00* (2006.01)
*A01C 23/04* (2006.01)

(52) U.S. Cl.
CPC ............... *B60G 2400/0522* (2013.01); *B60G 2400/204* (2013.01); *B60G 2400/252* (2013.01); *B60G 2400/41* (2013.01); *B60G 2500/30* (2013.01); *B60G 2600/14* (2013.01); *B60G 2600/16* (2013.01); *B60G 2600/17* (2013.01); *B60G 2600/182* (2013.01); *B60G 2800/012* (2013.01); *B60G 2800/014* (2013.01); *B60G 2800/914* (2013.01)

(56) References Cited

U.S. PATENT DOCUMENTS

| | | |
|---|---|---|
| 5,366,236 A | 11/1994 | Kuriki et al. |
| 5,510,983 A | 4/1996 | Majeed et al. |
| 5,538,264 A | 7/1996 | Brown et al. |
| 5,709,394 A | 1/1998 | Martin et al. |
| 5,725,066 A | 3/1998 | Beard et al. |
| 5,899,288 A | 5/1999 | Schubert et al. |
| 6,010,139 A | 1/2000 | Heyring et al. |
| 6,029,764 A | 2/2000 | Schubert |
| 6,032,770 A | 3/2000 | Alcone et al. |
| 6,273,203 B1 | 8/2001 | Paggi et al. |
| 6,612,375 B2 | 9/2003 | Rogala |
| 6,749,035 B2 | 6/2004 | Bundy |
| 6,820,877 B1 | 11/2004 | Ichimura et al. |
| 6,834,736 B2 | 12/2004 | Kramer et al. |
| 7,222,475 B2 | 5/2007 | Bomleny et al. |
| 7,234,386 B2 | 6/2007 | Sehedgick et al. |
| 7,726,665 B2 | 6/2010 | Bitter |
| 8,185,269 B2 | 5/2012 | Li et al. |
| 8,297,634 B2 | 10/2012 | Bittner |
| 8,297,643 B2 * | 10/2012 | Funakura ................. B62B 9/20 280/47.36 |
| 8,342,280 B2 | 1/2013 | Turco et al. |
| 8,352,121 B2 | 1/2013 | Bitter |
| 8,406,955 B2 | 3/2013 | Iwami et al. |
| 8,442,720 B2 | 5/2013 | Lu et al. |
| 8,820,456 B2 | 9/2014 | Virtanen et al. |
| 9,193,243 B2 | 11/2015 | Ono et al. |
| 9,290,074 B2 * | 3/2016 | Slawson ............. B60G 17/005 |
| 9,452,655 B2 | 9/2016 | Hiebert et al. |
| 9,504,211 B2 * | 11/2016 | Venton-Walters ..... A01G 25/09 |
| 9,604,519 B2 * | 3/2017 | Slawson ............. B60G 17/005 |
| 2012/0073843 A1 | 3/2012 | Kure |
| 2013/0277125 A1 | 10/2013 | Moser |
| 2015/0102568 A1 * | 4/2015 | Slawson ............. B60G 17/005 280/5.514 |
| 2016/0280292 A1 | 9/2016 | Satzler |
| 2016/0297275 A1 | 10/2016 | Traut et al. |
| 2016/0330948 A1 | 11/2016 | Schnaider et al. |
| 2017/0015174 A1 | 1/2017 | Ruppert |
| 2017/0072761 A1 * | 3/2017 | Slawson ............. B60G 17/005 |
| 2017/0203628 A1 | 7/2017 | Dames et al. |

* cited by examiner

SUSPENSION CONTROL SYSTEM PROVIDING ORIENTATION CONTROL FOR AN AGRICULTURAL MACHINE

FIELD OF THE INVENTION

The invention relates generally to agricultural product application equipment such as self-propelled sprayers and, in particular, to a suspension system for an agricultural machine which includes suspension assemblies, pressure sensors, electronically controlled valves, a vehicle sensor, such as speed sensor, a turn angle sensor and/or an Inertial Measurement Unit (IMU), and a processor configured to compare an output of the vehicle sensor to a threshold and control the electronically controlled valves to apply height corrections when the output exceeds the threshold.

BACKGROUND OF THE INVENTION

High-clearance sprayers are getting larger and more complex to allow for increasing coverage in a single pass, which improves application efficiency. Such sprayers may encounter a variety of ground surface conditions such as rocks, bumps, mounds, holes, grades, slopes, and the like, many of which may affect differing wheels of the machine at differing times. As a result, laterally extending sprayer booms may contact the ground at times, thereby potentially resulting in damage. Also, uneven distribution of weight of the agricultural machine at certain wheels may cause the machine to lose traction, get stuck, or create other operating hazards. In order to minimize the effect of such conditions, operators typically travel at low speeds (on the order of 5 mph or less) when there is a risk of encountering such ground surface conditions. However, traveling at low speeds has the disadvantage of requiring more time for treating an agricultural field which may result in operator fatigue, machine wear and tear, and/or lost productivity. It is therefore desirable to improve the suspension system for such machines.

SUMMARY OF THE INVENTION

One or more vehicle sensors can be used in a suspension control system of an agricultural machine to dynamically adjust pistons located proximal to wheels of the machine to substantially control orientation. Such vehicle sensors could include: a speed sensor configured to provide an output indicating a speed of the machine; a turn angle sensor configured to provide an output indicating a turn angle of the machine; and/or an Inertial Measurement Unit (IMU) configured to detect a chassis-to-horizon angle. The output can be compared to a threshold for determining when to control valves in the suspension system to apply height corrections.

Suspension cylinders or other suspension components can be monitored at each corner of a sprayer to determine values related to magnitudes of suspension flex or droop at each corner of the sprayer. These values, relative to different ones of each other, can correspond to amounts of articulation, roll, and/or pitch experienced by the sprayer at a given time. A controller can use these observed values to determine target values for amounts of extension of suspension cylinder rods or positions of other suspension components to achieve desired ride characteristics such as ride height and/or machine orientation. This may be done by using summing functions that add the observed values that correspond to, for example, articulation, roll, pitch, and/or height to determine target values at each corner. The controller commands each of the suspension cylinders to extend or retract its rod based on the target values to try achieving the desired chassis height and/or orientation characteristics. Maintaining a desired chassis height and/or orientation characteristic(s) may facilitate, for example, maintaining a spray boom parallel to the horizon, maintaining the boom parallel to the ground, avoiding wheelie-type movements during rapid acceleration by pulling the front of the sprayer down while accelerating, avoiding nosedive-type movements during rapid deceleration by pushing the front of the sprayer up while decelerating, and rolling out of corners by leaning the sprayer inwardly during turning maneuvers.

A piston can be located proximal to each wheel in four corners of an agricultural machine (typically four wheels, though two or more wheels could be provided at each wheel location). Each piston can be operable to adjust the height of the agricultural machine with respect to its proximal wheel via a stroke of the piston. Each piston can be in communication with a sensor for determining the stroke of the piston, an accumulator for holding fluid for the piston, a control valve for actuating flow of the fluid, and a closed-loop controller (which may be a Proportional-Integral-Derivative (PID) controller) for setting the stroke of the piston to a target set point while minimizing a feedback error measured by the piston sensor. Each piston may also be in communication with a diagonally opposing piston for controlling fluid flow in the diagonally opposing piston, including as described in U.S. Pat. No. 8,297,634 which is incorporated by reference. A control system can be provided in the agricultural machine for dynamically adjusting the pistons located proximal to each wheel. The control system can implement logic to: (1) continuously assesses articulation, pitch, roll and/or machine height with respect to the wheels based on sensor readings of the pistons located proximal to the wheels; (2) determine target height settings for each wheel to provide an orientation of the machine above the ground surface thereby protecting laterally extending sprayer booms (and/or substantially equalizing distribution of weight of the machine at each wheel); and (3) send a stroke set point based on the target height to a closed-loop controller (which may be a PID controller) in communication with each piston continuously operating to adjust the piston to the target. Articulation may be determined by (1) sensing the stroke of each piston via the corresponding piston sensors; (2) determining a first average stroke between a first diagonal pair of sensors and a second average stroke between a second diagonal pair of sensors; and (3) subtracting the second average stroke from the first average stroke. The resulting magnitude can represent the average amount of articulation on one pair of diagonally opposing wheels with respect to another pair of diagonally opposing wheels, and the resulting sign can represent the direction of articulation, which may be clockwise or counterclockwise. Pitch, or forward/reverse lean, may be determined by calculating a piston measurement differential between front and back of the machine. Roll, or side-to-side lean, may also be determined by calculating a piston measurement differential between sides of the machine. The control system may determine fluid flow in the suspension system by estimating total fluid in each closed loop piston system. Fluid can be estimated using a sensor and/or pressure transducer in each piston and application of the ideal gas law ($pV=nRT$) with respect to each accumulator, and tracking fluid flow between diagonally opposing pistons. Upon determining articulation, pitch, roll and/or machine height, the control system can calculate a target height for each corner of the machine (near each piston/wheel), and can translate each target height to a corresponding stroke adjustment for each piston based on a predetermined geometry of the machine (e.g., wheel radius, piston stroke, angle, pan height, and so forth). The calculated stroke adjustment is sent to each piston, and the closed loop controller for each piston can operate to minimize a sensed feedback error to achieve the calculated stroke adjustment. Accordingly, the sensed feedback error can be provided as part of two closed loops: (1) a first loop executing the control system for determining the calculated stroke adjustment; and (2) a second loop for achieving the provided stroke adjustment at each piston.

Specifically then, one aspect of the present invention can provide a suspension system for an agricultural machine, including: multiple suspension assemblies, each suspension assembly including a swing frame assembly and a cylinder, each cylinder including a piston rod configured to extend and retract with respect to a base, in which the swing frame assembly is coupled to the agricultural machine at a pivot point and is coupled to a wheel at a hub point, and including the cylinder is operationally coupled to the agricultural machine at a cylinder point and is also operationally coupled to the swing frame assembly at an actuation point distal from the pivot point such that action of the cylinder at the actuation point causes the swing frame assembly to pivot at the pivot point; multiple tires, each tire being mounted to a wheel; multiple electronically controlled valves, each electronically controlled valve being configured to control a flow of fluid to and from a control volume for operating a cylinder; a vehicle sensor configured to provide an output, the vehicle sensor being selected from a group consisting of: a speed sensor configured to provide an output indicating a speed of the agricultural machine, and a turn angle sensor configured to provide an output indicating a turn angle of the agricultural machine; and a processor in communication with the position sensors, the electronically controlled valves, and the vehicle sensor, the processor executing a program stored in a non-transient medium to: determine a height for each suspension assembly from a position indicated by a position sensor configured with respect to a cylinder of the suspension assembly; calculate at least one of pitch and roll of the agricultural machine to determine a height correction for each suspension assembly, in which pitch is a comparison between front and back heights of the agricultural machine, and roll is a comparison between left side and right side heights of the agricultural machine; compare the output of the vehicle sensor to a threshold; and control the electronically controlled valves to change the control volumes to apply the height corrections when the output exceeds the threshold.

Yet another aspect of the invention can provide a suspension system for an agricultural machine, including: multiple suspension assemblies, each suspension assembly including a swing frame assembly and a cylinder, each cylinder including a piston rod configured to extend and retract with respect to a base, in which the swing frame assembly is coupled to the agricultural machine at a pivot point and is coupled to a wheel at a hub point, and including the cylinder is operationally coupled to the agricultural machine at a cylinder point and is also operationally coupled to the swing frame assembly at an actuation point distal from the pivot point such that action of the cylinder at the actuation point causes the swing frame assembly to pivot at the pivot point; multiple tires, each tire being mounted to a wheel; multiple electronically controlled valves, each electronically controlled valve being configured to control a flow of fluid to and from a control volume for operating a cylinder; an Inertial Measurement Unit (IMU) configured to detect a chassis-to-horizon angle; and a processor in communication with the position sensors, the electronically controlled valves, and the IMU, the processor executing a program stored in a non-transient medium to: determine a height for each suspension assembly from a position indicated by a position sensor configured with respect to a cylinder of the suspension assembly; calculate at least one of pitch and roll of the agricultural machine to determine a height correction for each suspension assembly, in which pitch is a comparison between front and back heights of the agricultural machine, and roll is a comparison between left side and right side heights of the agricultural machine; compare an output of the IMU to a threshold; and control the electronically controlled valves to change the control volumes to apply the height corrections when the output of the IMU exceeds the threshold.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
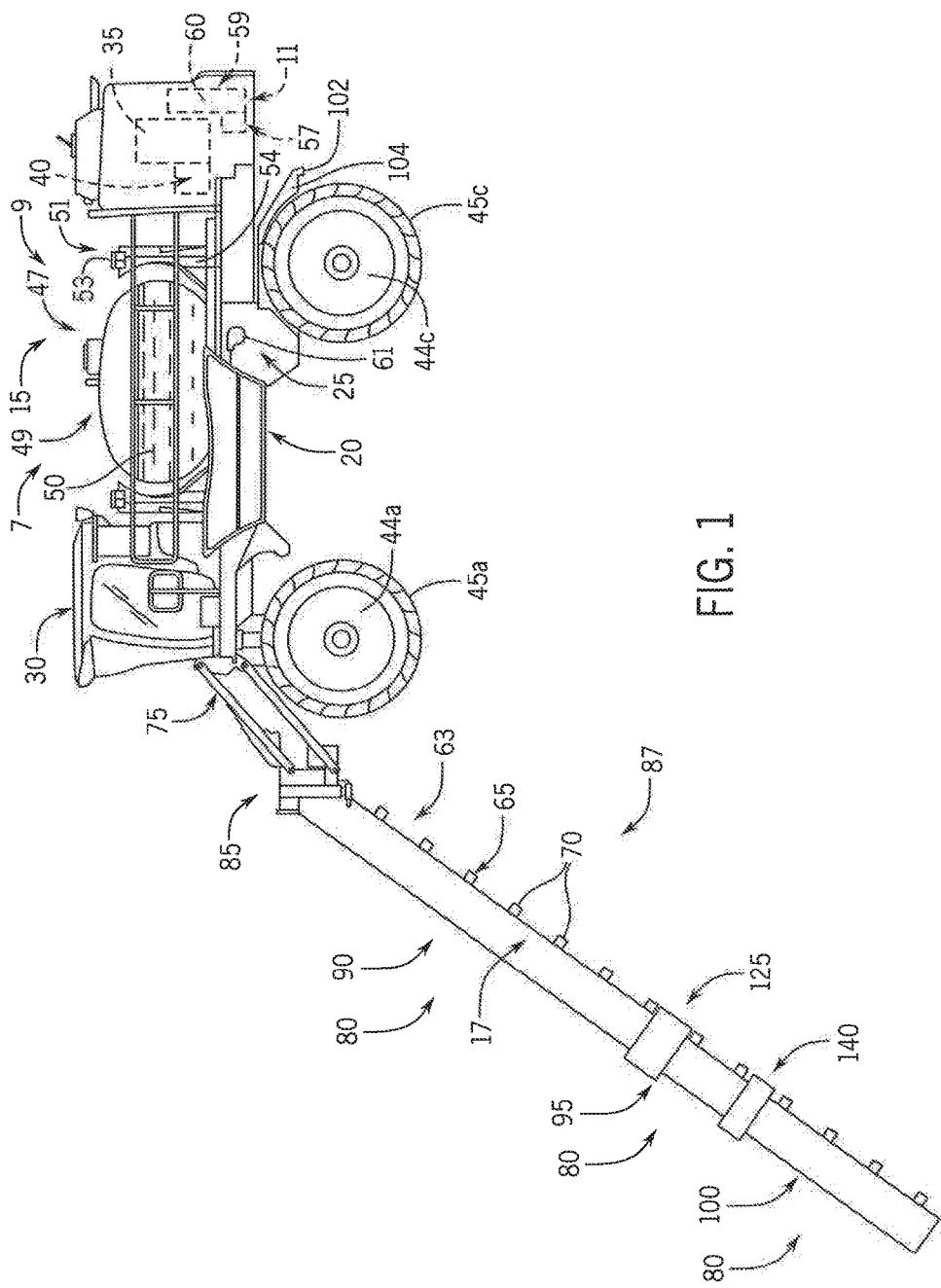
FIG. 1 is a side elevation of an exemplar agricultural machine according to the present invention.

Referring now to the drawings and specifically to FIG. 1, an agricultural machine is shown here as a self-propelled agricultural sprayer vehicle or self-propelled sprayer 15 having a spray boom 17, such as those available from CNH Industrial, including the Miller Nitro and Condor Series sprayers and New Holland Guardian Series sprayers. The sprayer 15 includes a chassis 20 having a chassis frame 25 that supports various assemblies, systems, and components. These various assemblies, systems, and components include a cab 30, an engine 35, and a hydraulic system 40. The hydraulic system 40 receives power from the engine 35 and includes at least one hydraulic pump which may be in a hydrostat arrangement for providing hydraulic pressure for operating hydraulic components within the hydraulic system 40. For sprayers with hydrostatic drives, hydraulic motors are operably connected to the hydraulic pump(s) for rotating wheels 44 with tires 45 mounted thereon. In mechanical drive applications, a mechanical transmission receives power from the engine 35 and delivers power for rotating the wheels 44 (and tires 45) by way of power-transmitting driveline components such as drive shafts, differentials, and other gear sets in portal, drop boxes, or other housings. In one aspect, the sprayer 15 can include four wheels 44, including: a front left wheel 44a (with a front left tire 45a mounted thereon), a front right wheel 44b (with a front right tire 45b mounted thereon), a back left wheel 44c (with a back left tire 45c mounted thereon) and back right wheel 44d (with a back right tire 45d mounted thereon). Although an arrangement with four wheels 44 is shown by way of example, in another aspect, greater or lesser numbers of wheels 44 could be implemented, such as a sprayer 15 with six wheels 44, could be implemented. In addition, although wheels 44 with tires 45 mounted thereon are shown by way of example, in another aspect, continuous bands of treads or track plates could be driven instead by two or more wheels each.

Still referring to FIG. 1, a product system 7 can include a product storage system 47 with a product tank 49 storing an agricultural liquid product 50 on the chassis 20. Product 50 can include any of a variety of agricultural liquid products, such as various pesticides, herbicides, fungicides, liquid fertilizers, and other liquids including liquid suspensions beneficial for application onto agricultural fields by way of a spray boom 17. A rinse system 9 can include a rinse liquid storage system 51 having a rinse tank 53 storing a rinse liquid 54 such as water or another suitable rinse liquid. Also, an air purge system 11 can include a compressed air storage system having an air compressor 57 operably connected to an air tank 59 that stores air 60 compressed by a compressor 57. A flow system is configured to selectively direct liquid product 50, rinse liquid 54 and/or air 60 through various flow paths defined through the sprayer 15 and the boom 17 depending on whether a spraying procedure, a rinsing procedure, or a pneumatic purging or boom blow-out procedure is being performed. During spraying and rinsing procedures, the flow system can energize a pump 61 to convey either liquid product 50 or rinse liquid 54 to the boom 17.

In operation, the pump 61 can push either liquid product 50 or rinse liquid 54 through plumbing components such as interconnected pieces of tubing and through a boom flow system 63 that includes segments of boom tubing 65 for release out of spray boom nozzles 70 that are spaced from each another along the width of the boom 17 during spraying or rinsing operations of the sprayer 15 (according to activation/deactivation states which can be implemented, for example, using electronically controlled switches). Accordingly, such plumbing components can connect the product storage system 47, the rinse liquid storage system 51 and the boom 17 via an on-board valve system and boom valve system. During spraying procedures, groups of nozzles 70 defined in spray sections along the boom 17 can selectively deliver product 50 for release onto an agricultural field at locations corresponding to positions of activated spray sections. The boom 17 is connected to the chassis 20 with a lift arm assembly 75 that is configured to move the boom 17 up and down for adjusting the height of application of the product 50.

Figure 2:
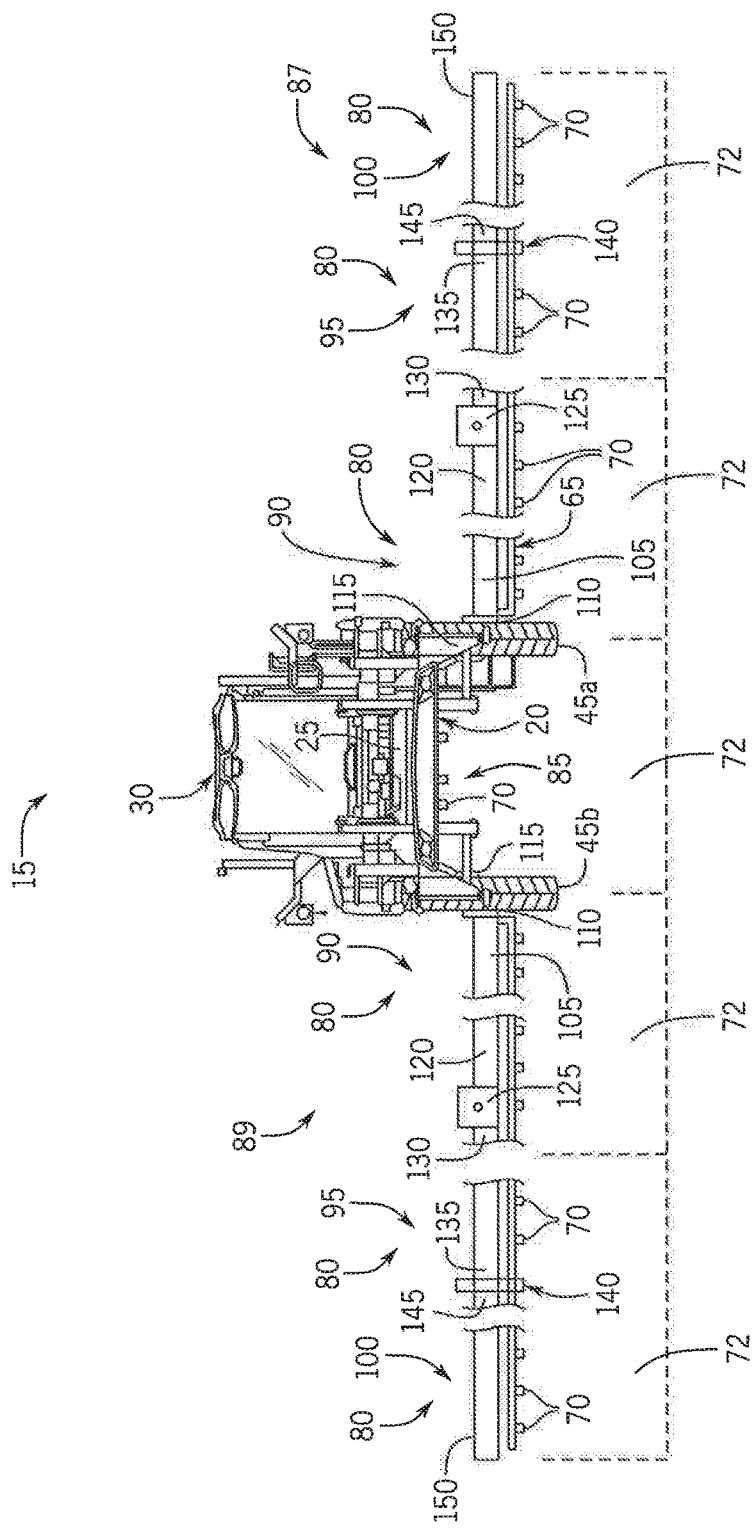
FIG. 2 is a front elevation of the agricultural machine of FIG. 1.

With additional reference to FIG. 2, the boom 17 can include multiple boom segments 80 connected longitudinally to provide the corresponding width of the assembled boom 17. Boom segments 80 include a center section 85 and left and right boom arms 87, 89 extending in opposite directions from center section 85. The left and right boom arms 87, 89 have multiple segments with pairs of primary boom segments 90, secondary boom segments 95, and breakaway boom segments 100 extending in opposite directions along the respective left and right boom arms 87, 89, mirrored about a longitudinal axis of the sprayer 15. The corresponding left and right segments of the pairs of primary, secondary, and breakaway boom segments 90, 95, 100 are substantially identical, so only one will be described, with the description applying to both the left and right segments of left and right boom arms 87, 89. Primary boom segment 90 has a primary boom inner end 105 that is connected with hinge 110 to center section outer end 115, with hinge 110 configured to allow for generally rearward horizontal pivoting of the boom primary, secondary, and breakaway segments 90, 95, 100 toward the chassis 20 when folding the boom 17 to achieve a stored position. Primary boom segment 90 extends from primary boom inner end 105 away from center section 85 to primary boom outer end 120. Hinge 125 is arranged between primary boom outer end 120 and secondary boom inner end 130 and is configured to allow for folding the secondary and breakaway segments 95, 100 relative to primary boom segment 90 to achieve the stored position. For horizontal folding of secondary and breakaway segments 95, 100 against the primary boom segment 90, the hinge 125 allows horizontal pivoting of the secondary and breakaway segments 95, 100 toward primary boom segment 90. For vertical folding of secondary and breakaway segments 95, 100 against the primary boom segment 90, the hinge 125 allows vertical pivoting of the secondary and breakaway segments 95, 100 toward to primary boom segment 90. Secondary boom segment 95 extends from secondary boom inner end 130 away from primary boom segment 90 to secondary boom outer end 135. Breakaway joint 140 is arranged between secondary boom outer end 135 and breakaway boom inner end 145 and is configured to allow for momentary deflecting of the breakaway boom segment 100 away from its outwardly extended position during collisions with the crops, the ground, and/or other obstacles. Breakaway boom segment 100 extends from breakaway boom inner end 145 away from secondary boom segment 95 to breakaway boom outer end 150. In the stored position of boom 17, the secondary and breakaway boom segments 95, 100 are folded against the primary boom segment 90. The primary boom segment 90 is folded toward chassis 20 so that the breakaway boom outer end 150 is near the primary boom inner end 105 tucked toward the front of sprayer 15 with the primary boom outer end 120 and secondary boom inner end 130 tucked toward the back of sprayer 15.

Suspension System

Figure 3:
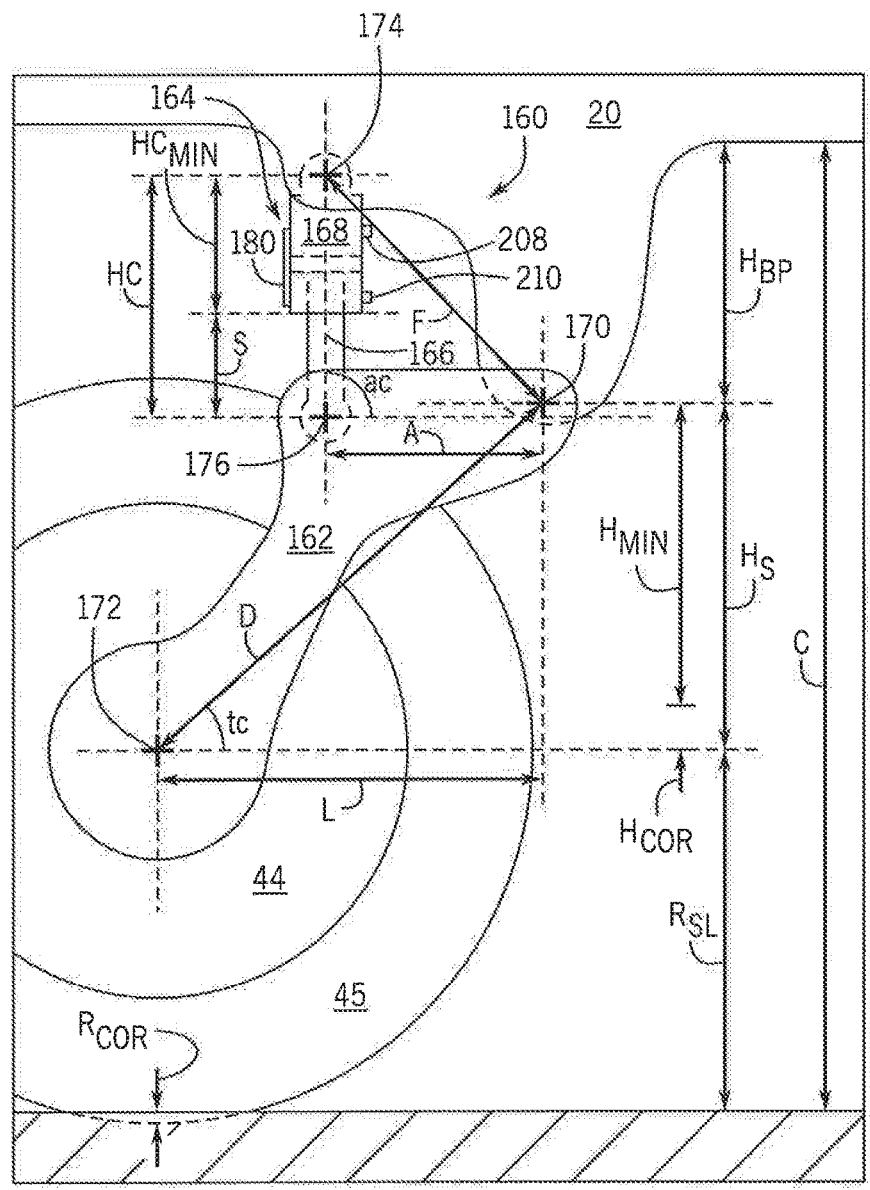
FIG. 3 is a simplified diagrammatic view of an exemplar suspension assembly of the agricultural machine of FIG. 1.

As explained in more detail below, the sprayer 15 can include a suspension system with four separate suspension assemblies 160, each corresponding to a respective wheel 44 of the sprayer 55. One suspension assembly 160 is illustrated in FIG. 3 by way of example. For the sprayer 15, front left, front right, back left and back right suspension assemblies 160a, 160b, 160c and 160d, respectively, can be similarly configured. However, alternative aspects can provide greater or lesser numbers of suspension assemblies.

In addition, although not specifically shown, one or more of the suspension assemblies 160 can include elements for steering, such as at the front left and front right suspension assemblies 160a and 160b, respectively, for two wheel steering, and optionally, at the back left and back right suspension assemblies 160c and 160d, respectively, for four wheel steering. Also, although not specifically shown, the suspension assembly 160 could be configured as part of an axle slider (or "slidable drawer") assembly that could move back and forth into the chassis 20 to change the distance (or tread width) between wheels 44 on opposing sides of the sprayer 15. In such an arrangement, front and rear wheels on given sides, such as the left front wheel 44a and the left rear wheel 44c, can be attached to the same axle slider to ensure alignment of rear wheels behind front wheels. Such concepts are additionally described in U.S. Pat. No. 8,297,634 which is incorporated by reference.

Each suspension assembly 160 can include a swing frame assembly 162 and cylinder 164. The cylinder 164 could be a single or dual action cylinder that is responsive to a fluid in a control volume, such as an oil (hydraulic) or gas (pneumatic). The cylinder 164 can include a piston rod 166 configured to extend and retract with respect to a base 168. The swing frame assembly 162 can connect to the sprayer 15 at a pivot point 170 which could be on a relative corner of the chassis 20. The swing frame assembly 162 can also connect to one or more wheels 44, with tires 45 mounted thereon, at a hub point 172 (or multiple wheels, including for driving a continuous band of treads or track plates). The cylinder 164 can be operationally coupled to the agricultural machine at a cylinder point 174 which could also be on a relative corner of the chassis 20. The cylinder 164 can also be operationally coupled to the swing frame assembly 162 at an actuation point 176 distal from the pivot point 170. This arrangement allows action of the cylinder 164 at the actuation point 176 to cause the swing frame assembly 162 to pivot at the pivot point 170. Connections between the swing frame assembly 162 and the pivot point 170, the swing frame assembly 162 and the hub point 172, the cylinder 164 and the cylinder point 174, and/or the cylinder 164 and the actuation point 176, could be made, for example, by pins secured through holes in the swing frame assembly 162 and/or the cylinder 164 and corresponding channels in the chassis 20 and/or the wheels 44, and including mounting brackets in certain instances. In one aspect, the base 168 of each cylinder can be operationally coupled at the cylinder point 174, and the piston rod 166 of each cylinder can be operationally coupled at the actuation point 176, as shown in FIG. 3. However, in another aspect, the base 168 of each cylinder can be operationally coupled at the actuation point 176, and the piston rod 166 of each cylinder can be operationally coupled at the cylinder point 174.

Accordingly, a position of the piston rod 166 with respect to the base 168 (indicated by stroke "S") can configure a relative suspension height (indicated by "$H_S$") for the suspension assembly 160. In operation, with the cylinder 164 being a dual action cylinder, the piston rod 166 can be set to a default stroke length, and can extend and retract from the default stroke length with motion of the sprayer 15 over terrain, which may serve to dampen and control the pivot motion of the swing frame assembly 162.

Several parameters of the suspension assembly 160 can be predetermined and stored in a suspension control system for calculating the suspension height ($H_S$). Such predetermined parameters can include: a distance between the pivot point 170 and the hub point 172 (indicated by "D"); a distance between the pivot point 170 and the cylinder point 174 (indicated by "F"); a distance between the pivot point 170 and the actuation point 176 (indicated by "A"); a vertical distance between the pivot point 170 and a lower most central area of the chassis 20 (or belly pan) which provides clearance for the sprayer 15 over crops and the ground below (indicated by "$H_{BP}$"); a length of the cylinder 164 when the piston rod 166 is completely retracted or collapsed (indicated by "$HC_{MIN}$"); and a length of the piston rod 166 when completely extended from the cylinder 164 (where a stroke "S" of the piston rod 166 becomes "$S_{MAX}$"). It should be appreciated that any length of the cylinder 164 (indicated by "HC") is therefore equal to the length of the cylinder 164 when the piston rod 166 is completely retracted ($HC_{MIN}$) plus the stroke of the piston rod 166 (S). By way of example, the vertical distance between the pivot point 170 and the lower most central area of the chassis 20 ($H_{BP}$) could be about 15.112 inches; the distance between the pivot point 170 and the hub point 172 (D) could be about 69.170 inches; the distance between the pivot point 170 and the actuation point 176 (A) could be about 29 inches; the distance between the pivot point 170 and the cylinder point 174 (F) could be about 29 inches; the length of the piston rod 166 when completely extended from the cylinder 164 ($S_{MAX}$) could be, for example, about 8 inches; and the length of the cylinder 164 when the piston rod 166 is completely retracted ($HC_{MIN}$) could be about 19 inches. From the predetermined parameters, additional parameters can be derived, including: an arm-to-cylinder angle between a first line through the cylinder point 174 and the actuation point 176 and a second line through the actuation point 176 and the pivot point 170 (indicated by the angle "ac"); and a wheel-to-arm angle between a third line through the hub point 172 and the pivot point 170 and a fourth line horizontally through hub point 172 (indicated by "tc").

In addition, a position sensor 180 can be arranged with respect to each cylinder 164. Each position sensor 180 can be configured to generate an electrical signal to the suspension control system for indicating a position of the corresponding piston rod 166 with respect to the base 168, corresponding to the stroke (S). For example, with the piston rod 166 having a length of about 8 inches, the piston rod 166 could be set to a default stroke that is a midpoint of 4 inches (S=4). When the piston rod 166 is completely extended ($S_{MAX}$), the stroke length could be 8 inches (S=8), and when the piston rod 166 is completely retracted ($S_{MIN}$), the stroke length could be 0 inches (S=0).

From the aforementioned predetermined and derived parameters, and from the position from the position sensor 180 indicating the stroke (S), the suspension height ($H_S$) for any suspension assembly 160 can then be geometrically calculated, such as according to the equation:

$$H_S = D*\cos(\_tc - (A\cos((\_A\char`\^2 + \_F\char`\^2 - (S + \_HC_{MIN})\char`\^2)/(2*\_A*\_F)) - \_ac)).$$

In addition, as explained in more detail below, the suspension height ($H_S$) is equal to the suspension height when the piston rod 166 is completely retracted (indicated by "$H_{MIN}$") plus a suspension height correction (indicated by "$H_{COR}$"). By way of example, the suspension height when the piston rod 166 is completely retracted ($H_{MIN}$) could be about 16.145 inches.

In addition, each tire 45 can have a static load rolling circumference (indicated by "$R_{SL}$") providing a height dimension from the hub point 172 to the ground. By way of example, the static load rolling circumference of the tire 45 ($R_{SL}$) could be about 34 inches. A summation of the rolling circumference ($R_{SL}$), the suspension height ($H_S$) and the vertical distance between the pivot point 170 and the lowermost central area of the chassis 20 ($H_{BP}$) provides an overall clearance for the sprayer 15 (indicated by "C") over crops and the ground below. The clearance (C) can be an adjustable value set by the operator, such as 75 inches.

However the static load rolling circumference ($R_{SL}$) can be reduced by varying amounts depending on the downward force or load exerted on the tire 45. For example, as additional force (including weight) is applied to the tire 45, such as by loading the product tank 49 with the agricultural liquid product 50, the tire 45 will increasingly deflect by a deflection value (indicated by "$R_{COR}$"), also known as tire squat, and the static load rolling circumference ($R_{SL}$) will decrease accordingly. Conversely, as force is reduced from the tire 45, such as by emptying the product tank 49 during spray operations, the tire 45 will decreasingly deflect by the deflection value ($R_{COR}$) and the static load rolling circumference ($R_{SL}$) will increase. The varying deflection values ($R_{COR}$) may be specified in a look up table or other data structure 238 in a suspension control system (see FIG. 6) comparing such tire dimensions with applied forces in a working range. The data structure 238 can include multiple data sets unique for differing tires, each data set being based on tire size, type, and the like, according to tire manufactures. From the data structure 238, an accurate static load rolling circumference ($R_{SL}$), reduced by a deflection value ($R_{COR}$), can be determined for each tire 45. Although a suspension system with "leading" and "trailing" arms is generally described above by way of example, in other aspects, suspension systems with sliding and/or "wishbone" configurations could also be implemented. In such alternative aspects, the geometric calculations described above may differ to achieve the same result.

Control Volume

Figure 4:
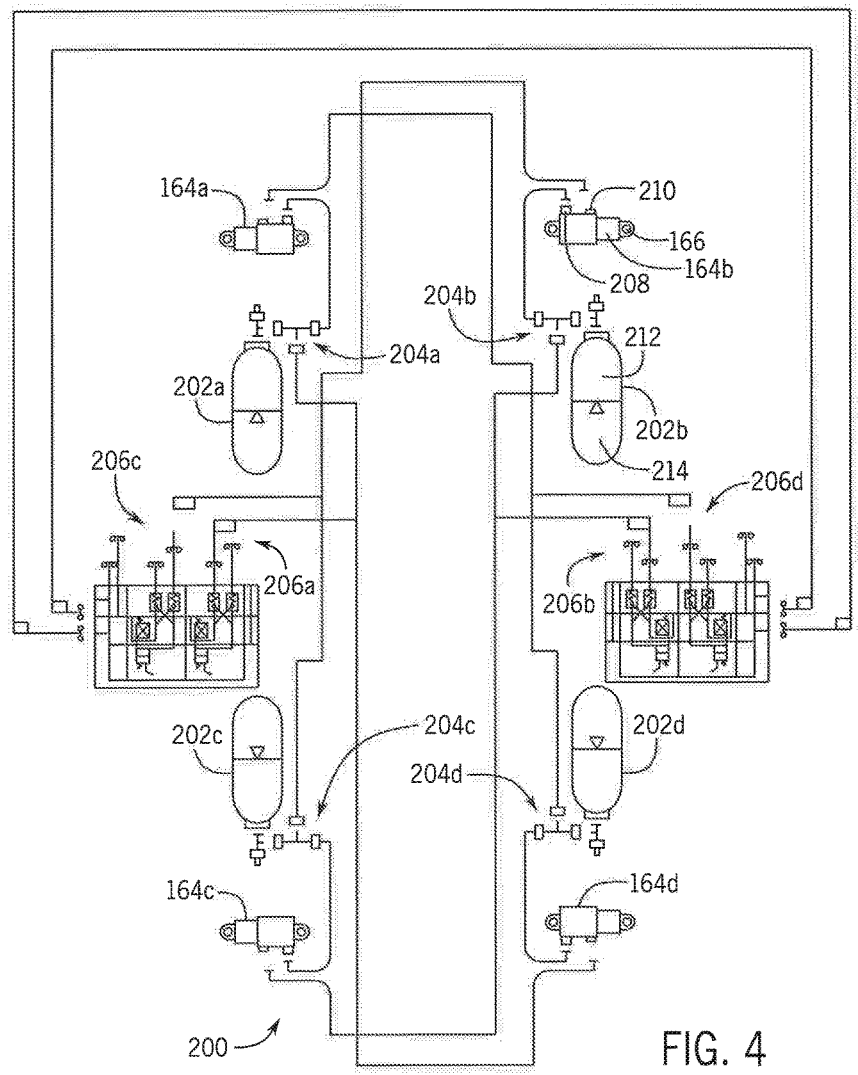
FIG. 4 is an exemplar portion of a suspension system of the agricultural machine of FIG. 1.

FIG. 4 is a schematic view of a portion of a suspension system 200 for the sprayer 15, provided in accordance with an aspect of the invention. In particular, in similar arrangements, as noted above, the left front suspension assembly 160a can include a left front cylinder 164a; the right front suspension assembly 160b can include a right front cylinder 164b; the left rear suspension assembly 160c can include a left rear cylinder 164c; and the right rear suspension assembly 160d can include a right rear cylinder 164d. The system 200 also includes accumulators 202a-d, various lines, hoses, and fittings, such as T-fittings 204a-d, and electronically controlled dual valves 206a-d for controlling fluid, such as oil (hydraulic) or gas (pneumatic), stored in a reservoir 216 (FIG. 5), flowing to and from control volumes 218 of fluid in the system. Each accumulator 202 can have two chambers or portions separated by a diaphragm, with an incompressible fluid portion 212 in one and a compressible gas portion in the other 214.

Each of the cylinders 164 is similar to the others and operates in a similar manner. Specifically, with additional reference to FIG. 5, with respect to right front cylinder 164b, it includes a base port 208, a rod port 210, and a movable piston rod 166. Fluid in a control volume 218b entering the base port 208 (and exiting the rod port 210 in a control volume 218c) causes the piston rod 166 to extend, and fluid in the control volume 218b entering the rod port 210 (and exiting the base port 208 in the control volume 218c) causes the piston rod 166 to retract. Accordingly, the base port 208 of the cylinder 164b is in fluid communication through the control volume 218b with the fluid portion 212 of a respective associated accumulator 202b via an associated T-fitting 204b. In operation, when the right front wheel 44b goes over a bump for example, the piston rod 166 retracts, causing fluid to exit the base port 208 and flow to the fluid portion 212 of the associated accumulator 202b. When the sprayer 15 travels past the bump, fluid from this chamber of the accumulator 202b flows back into the base port 208 causing the piston rod 166 to extend to its previous position. In this manner, the accumulator essentially operates as a spring, and resistance of fluid in the interconnecting lines essentially operates as a damper or shock absorber.

The valves 206 control the amount of fluid in the associated accumulator 202 such that a desired neutral position (approximately the mid-stroke position) of the piston rod 166 in each of the cylinders 164 can be achieved based on the load of the sprayer 15. In this manner, each piston rod 166 is movable a sufficient amount in each direction to achieve the necessary pivot motion of the swing frame assemblies 162, and desired vehicle height can be achieved for the sprayer 15.

The system 200 also cross-connects the independent suspension assemblies. In particular, the cylinder 164 of each suspension assembly 160 is in fluid communication with a cylinder 164 of a diagonally opposing suspension assembly 160. For example, in FIG. 5, the cylinder 164b is in fluid communication with the identical cylinder 164c on the diagonally opposite side of the sprayer 15. Specifically, the base port 208 of the cylinder 164b is in fluid communication (via the T fitting 204b) with the rod port 210 of the cylinder 164c, and the base port 208 of the cylinder 164c completes the loop by connecting (via another T-fitting 204c) to the rod port 210 of the cylinder 164b. Similarly, the cylinder 164a is in fluid communication with the identical cylinder 164d on the diagonally opposite side of the sprayer 15. Specifically, the base port 208 of the cylinder 164a is in fluid communication (via the T fitting 204a) with the rod port 210 of the cylinder 164d, and the base port 208 of the cylinder 164d completes the loop by connecting (via another T-fitting 204d) to the rod port 210 of the cylinder 164a. These interconnections are cross-piped in this manner such that when cylinders 164a or 164b in one assembly moves to an extended or a retracted position (due to irregularities in the terrain or forces associated with the sprayer 15 turning), then the associated cylinder 164d or 164c, respectively, in the diagonally opposite assembly would also be urged to the same extended or retracted position. Likewise, if the cylinder 164d or 164c is forced to an extended or a retracted position, then the associated cylinder 164a or 164b, respectively, in the diagonally opposite assembly would be urged to the same extended or retracted position. This cross action of the cylinders helps to maintain sprayer 15 in a stable horizontal orientation, such that the chassis 20 remains level, and approximately constant weight distribution to all four wheels is maintained.

Figure 5:
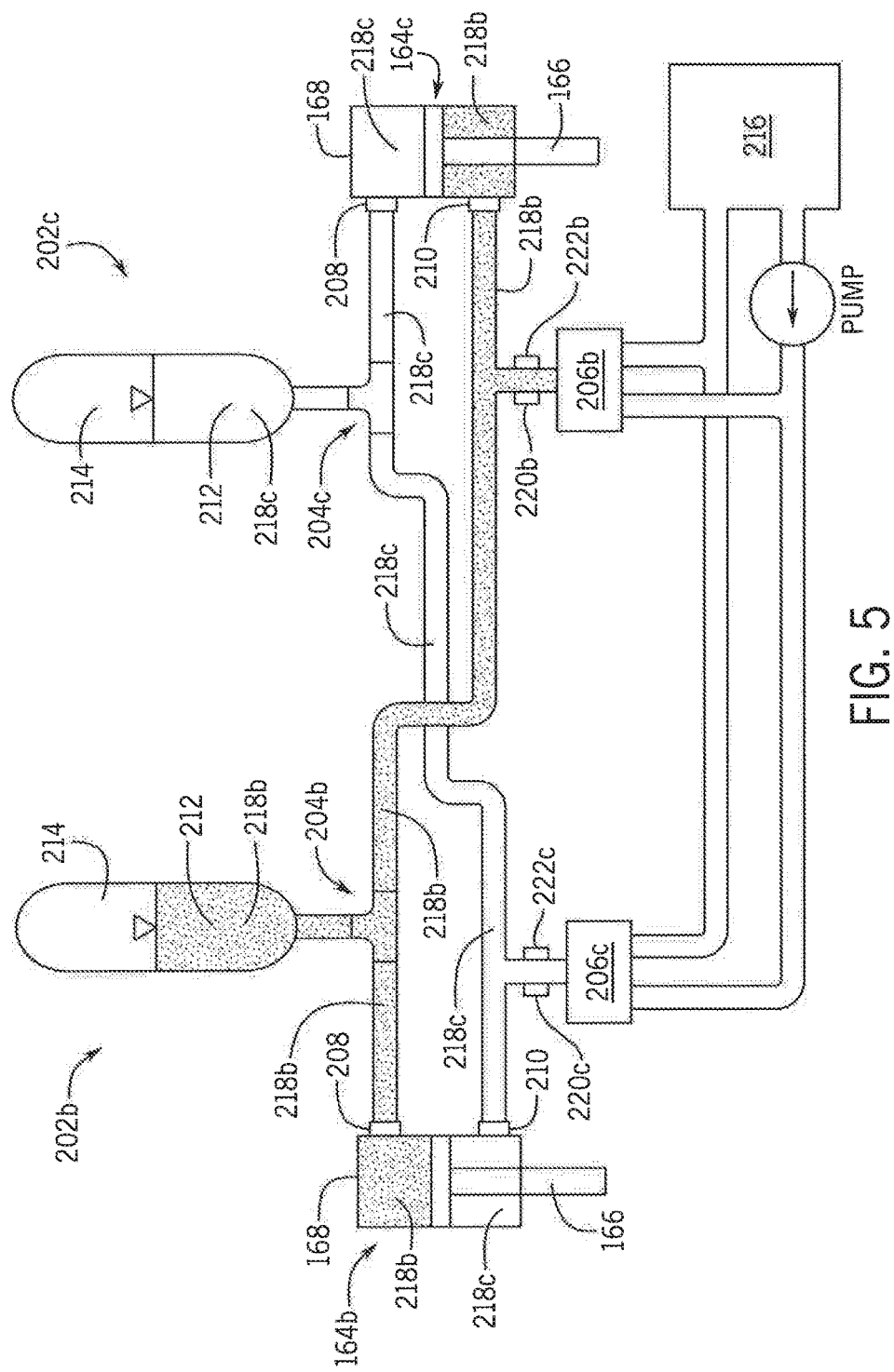
FIG. 5 is a schematic view of a pair of cross-connected suspension assemblies of FIG. 4.

In addition, a pressure sensor 220 can be arranged with respect to each control volume 218. Each pressure sensor 220 can be configured to generate an electrical signal to the suspension control system for indicating a pressure of a corresponding control volume 218. In one aspect, the pressure sensors 220 could be arranged as fittings in line with the valves 206. For example, as shown in FIG. 5, a pressure sensor 220b, arranged as a fitting in line with the valve 206b, can generate a signal indicating a pressure of the control volume 218b. Similarly, an optional temperature sensor 222 can be arranged with respect to each control volume 218. Each temperature sensor 222 when configured can generate an electrical signal to the suspension control system for indicating a temperature of a corresponding control volume 218. In one aspect, the temperature sensors 222 could be arranged as fittings in line with the valves 206. For example, as shown in FIG. 5, a temperature sensor 222b, arranged as a fitting in line with the valve 206b, can generate a signal indicating a temperature of the control volume 218b.

A level orientation of the sprayer 15 maintains approximately constant weight distribution among the wheels 44 and the tires 45. This, in turn, reduces overall soil compaction, reduces injury to crop roots, and improves tractive effort when low soil adhesion conditions exist, such as under muddy conditions.

Suspension Control

Figure 6:
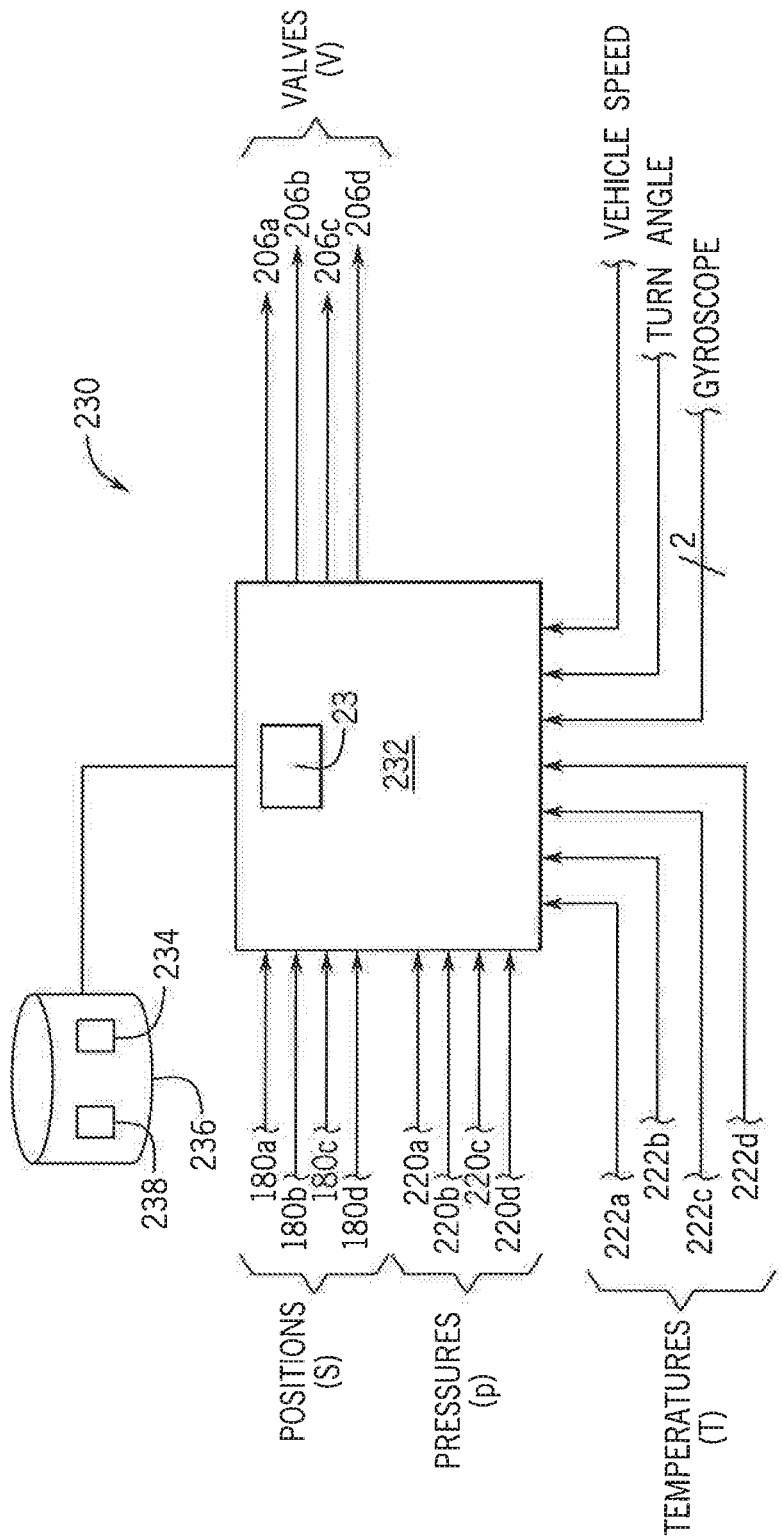
FIG. 6 is a diagram of a suspension control system of the agricultural machine of FIG. 1.

Referring now to FIG. 6, a suspension control system 230 can be configured for providing suspension control for the sprayer 15. The suspension control system 230 can include a controller 232 having a processor 233 in communication with the position sensors 180, the pressure sensors 220, the temperature sensors 222 and the valves 206. The processor 233 can communicate with the position sensors 180, the pressure sensors 220, the temperature sensors 222 and/or the valves 206, for example, through a Society of Automotive Engineers (SAE) 11939 bus, International Organization for Standardization (ISO) 11783 bus, ISO 11898 bus and/or other Controller Area Network (CAN) bus or other communications system. The processor 233 can communicate with the position sensors 180, the pressure sensors 220, the temperature sensors 222 and/or the valves 206 periodically, for example, with a refresh rate on the order of at least 50 milliseconds. The processor 233 can execute a program 234 stored in a non-transient medium 236 to receive signals from the position sensors 180, the pressure sensors 220 and/or the temperature sensors 222, and provide signals to the valves 206 for changing the control volumes 218, for optimally controlling the suspension system as described herein.

Figure 7:
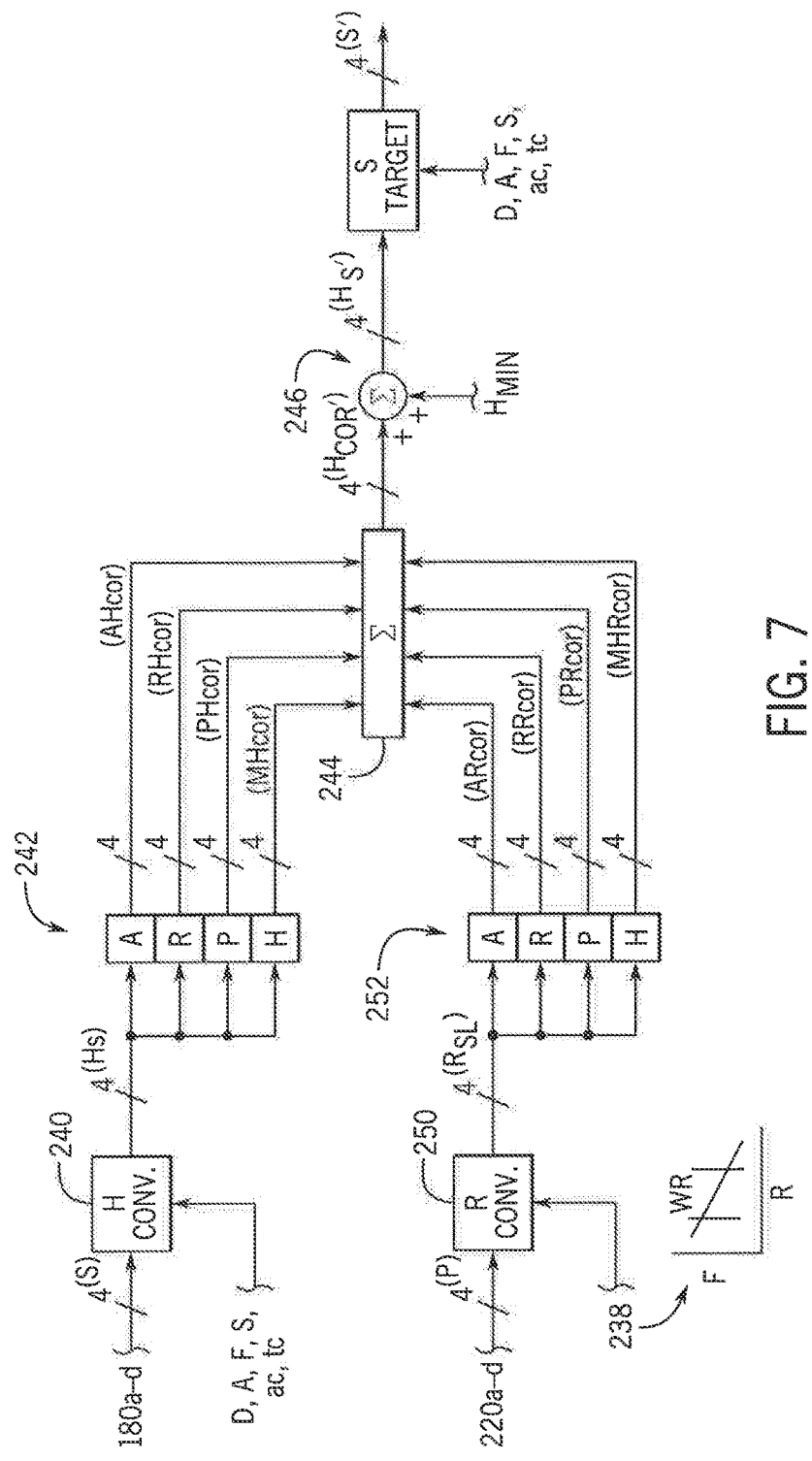
FIG. 7 is a schematic for providing height corrections in the suspension control system of FIG. 6.
Figure 8:
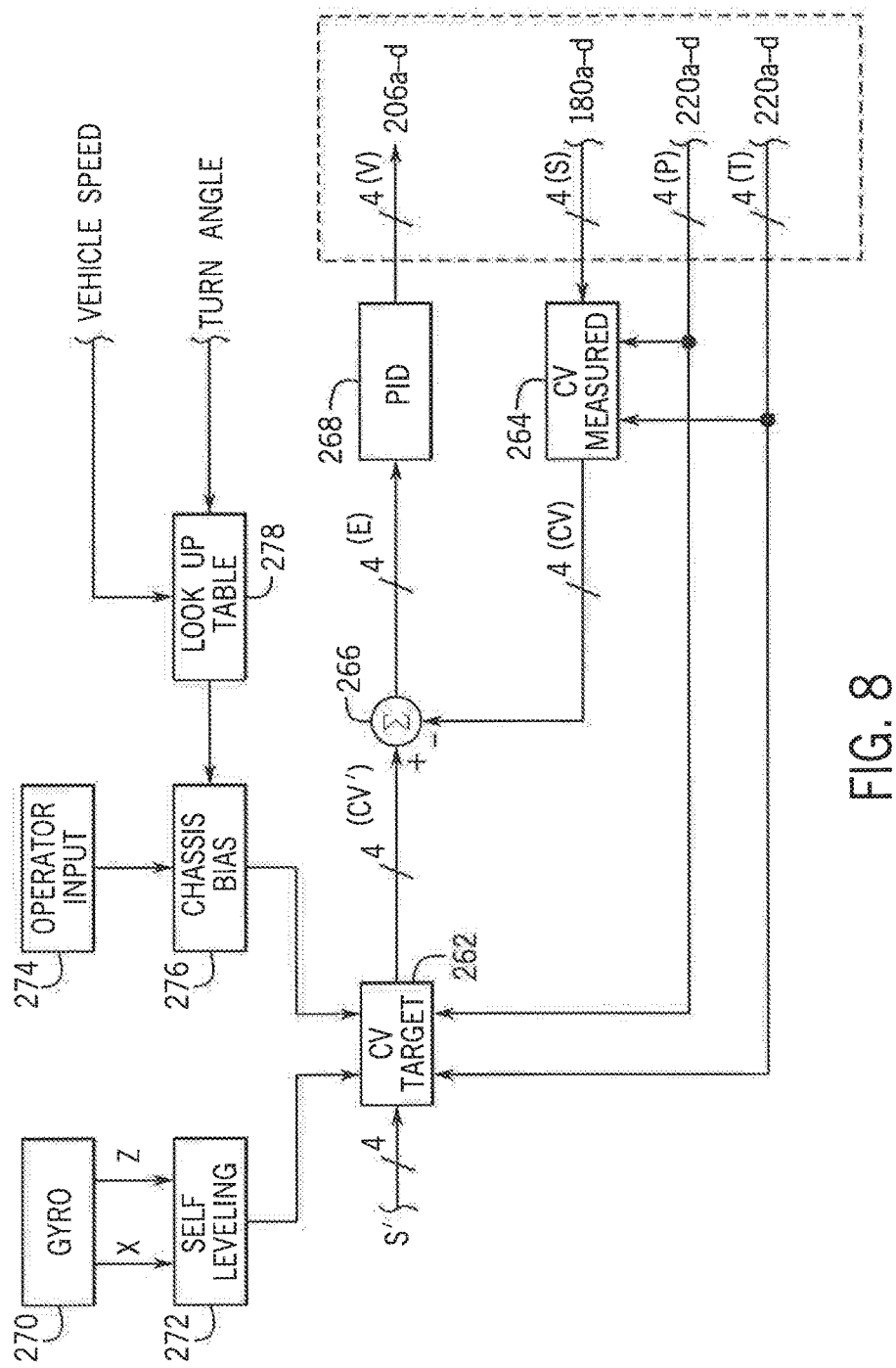
FIG. 8 is a schematic for controlling electronically controlled valves to apply the height corrections of FIG. 7.

With additional reference to FIG. 7, in one aspect, at block 240, the processor 233 can execute to determine a suspension height ($H_S$) for each suspension assembly 160 from a position indicated by a position sensor 180 configured with respect to a cylinder 164 of the suspension assembly 160, providing a stroke (S), including as described above with respect to FIG. 3. With the suspension heights ($H_S$) for each of the suspension assemblies 160 calculated, the processor 233 can then execute to calculate one or more of articulation (A), roll (R), pitch (P), and/or machine height (H) characteristics of the sprayer 15 in block 242, as described herein, to determine articulation height corrections (indicated by "$AH_{COR}$"), roll height corrections (indicated by "$RH_{COR}$"), pitch height corrections (indicated by "$PH_{COR}$") and/or machine height corrections (indicated by "$MH_{COR}$"), respectively. Each of the forgoing height corrections can be calculated in priority order to determine respective contributions to the height corrections ($R_{COR}$), as target height corrections ($R_{COR}'$), for optimizing the suspension assemblies 160. In this way, the suspension control system can account for multiple suspension characteristics, one after another, so long as adequate suspension heights ($H_S$) are available, including to maintain a user defined clearance (C) and/or a frame orientation of zero with respect to the horizon (FIG. 8). Such suspension heights ($H_S$) may be limited by maximum lengths of the piston rods 166 ($S_{MAX}$).

Although any of articulation, roll, pitch, and/or machine height characteristics can be considered in the suspension system in any priority order, articulation is preferably considered first. Articulation is a comparison between diagonally opposing suspension heights ($H_S$) of the sprayer 15. Articulation can be calculated as a difference between a first average of suspension heights ($H_S$) of the front left and back right suspension assemblies 160a, 160d and a second average of suspension heights ($H_S$) of the front right and back left suspension assemblies 160b, 160c to determine articulation height corrections ($AH_{COR}$). The articulation height corrections ($AH_{COR}$) can then be applied to the target height corrections ($R_{COR}'$) for the suspension assemblies 160 in a first summation block 244, to the extent adequate suspension height ($H_S$) remains.

Roll is a comparison between left side and right side suspension heights ($H_S$) of the sprayer 15. Roll can be calculated as a difference between a first average of suspension heights ($H_S$) of the front left and back left suspension assemblies 160a, 160c and a second average of suspension heights ($H_S$) of the front right and back right suspension assemblies 160b, 160d to determine roll height corrections ($RH_{COR}$). The roll height corrections ($RH_{COR}$) can then be applied to the target height corrections ($R_{COR}'$) for the suspension assemblies 160 in the first summation block 244, to the extent adequate suspension height ($H_S$) remains.

Pitch is a comparison between front and back suspension heights ($H_S$) of the sprayer 15. Pitch can be calculated as a difference between a first average of suspension heights ($H_S$) of the front left and front right suspension assemblies 160a, 160b and a second average of suspension heights ($H_S$) of the back left and back right suspension assemblies 160c, 160d to determine pitch height corrections ($PH_{COR}$). The pitch height corrections ($PH_{COR}$) can then be applied to the target height corrections ($R_{COR}'$) for the suspension assemblies 160 in the first summation block 244, to the extent adequate suspension height ($H_S$) remains.

Machine height is a comparison between an overall clearance for the sprayer 15 (C) over crops and the ground below, which can be provided as input from an operator, and a summation of the rolling circumference ($R_{SL}$) and the vertical distance between the pivot point 170 and the lower most central area of the chassis 20 ($H_{BP}$). The clearance (C), an adjustable value, might typically be set by an operator to 75 inches. Mathematically, the machine height can be expressed as $C-(R_{SL}+H_{BP})$. An average of the machine height can be determined and applied evenly to each of the suspension assemblies 160 as machine height corrections ($MH_{COR}$). The machine height corrections ($MH_{COR}$) can then be applied to the target height corrections ($R_{COR}'$) for the suspension assemblies 160 in the first summation block 244, to the extent adequate suspension height ($H_S$) remains.

Next, the target height corrections ($R_{COR}'$) can be applied to the suspension heights when the piston rod 166 is completely retracted ($H_{MIN}$) in a second summation block 246 to determine target suspension heights ($H_S'$) that are optimized for the suspension assemblies 160. From the target suspension heights ($H_S'$), and the aforementioned predetermined and derived parameters, target strokes (S') can then be geometrically calculated, such as according to the equation:

$$S'=(\_A^2+\_F^2-2*\_A*\_F*COS(A\ COS((H_S')/\_D)-\_tc-\_ac))^{0.5}-HC_{MIN}.$$

Then, with additional reference to FIG. 8, the processor 233 can execute to control the valves 206 in a closed loop control system 260 (see FIG. 8) to flow fluid to or from the control volumes 218 to minimize an error value (E) between determined (target) values and measured values.

Tire Deflection

In addition, in one aspect, at block 250, the processor 233 can execute to determine static load rolling circumference suspension height ($R_{SL}$) for each tire 45 from a pressure indicated by a pressure sensor 220 configured with respect to a control volume 218 for operating a cylinder 164 of the suspension assembly 160, providing a pressure (indicated by "p"), including as described above with respect to FIG. 5. In particular, the processor 233 can convert the pressures (p) to determine downward forces on the tires 45. The downward forces on the tires 45 could be determined, for example, by first calculating first forces from first pressures on first sides of the cylinders 164 of suspension assemblies 160 to which the tires 45 are mounted, calculating second forces from second pressures on second sides of the cylinders 164 of the suspension assemblies 160 to which the tires 45 are mounted, and comparing the first and second forces. The first sides of the cylinders 164 could include the base 168 and the base port 208, and the second side of the cylinder could include the piston rod 166 and the rod port 210. The first force is then a product of the first pressure and an area of the first side, and the second force is then a product of the second pressure and an area of the second side. However, given a portion of the area of the second side is consumed by the piston rod 166, that portion is subtracted from the area of the second side for determining the second force. The downward force is then determined as a differential between the first and second forces.

With the downward forces, the processor can then reference the data structure 238 to compare tire dimensions (indicated by "R") with applied forces (indicated by "F") in a working range (indicated by "WR"), as described above with respect to FIG. 3. Generally, in the working range (WR), tire dimensions (R) change proportionally with applied force (F). From the data structure 238, an accurate static load rolling circumference ($R_{SL}$), reduced by a deflection value ($R_{COR}$), can be determined for each tire 45.

Like the calculations above with respect to the suspension heights ($H_S$), with the static load rolling circumference ($R_{SL}$) for each tire 45 calculated, the processor 233 can execute to calculate one or more of articulation (A), roll (R), pitch (P), and/or machine height (H) characteristics of the sprayer 15, in block 252, due to tire deflection or squat, to determine articulation tire height corrections (indicated by "$AR_{COR}$"), roll tire height corrections (indicated by "$RR_{COR}$"), pitch tire height corrections (indicated by "$PR_{COR}$") and/or machine tire height corrections (indicated by "$MHR_{COR}$"), respectively. Each of the forgoing tire height corrections can be calculated in priority order to determine respective contributions to the tire height corrections ($R_{COR}$), as target tire height corrections ($R_{COR}'$), for further optimizing the suspension assemblies 160. In this way, the suspension control system can account for multiple tire deflection or squat characteristics, one after another, so long as adequate suspension heights ($H_S$) remain available.

Although any of articulation, roll, pitch, and/or machine tire height characteristics can be considered in the suspension system in any priority order, articulation is preferably considered first. Articulation is a comparison between diagonally opposing static load rolling circumferences ($R_{SL}$) of the sprayer 15. Articulation can be calculated as a difference between a first average of static load rolling circumferences ($R_{SL}$) of the front left and back right tires 45a, 45d and a second average of static load rolling circumferences ($R_{SL}$) of the front right and back left tires 45b, 45c to determine articulation tire height corrections ($AR_{COR}$). The articulation tire height corrections ($AR_{COR}$) can then be applied to the target height corrections ($R_{COR}'$) for the suspension assemblies 160 in the first summation block 244, to the extent adequate suspension height ($H_S$) remains.

Roll is a comparison between left side and right side static load rolling circumferences ($R_{SL}$) of the sprayer 15. Roll can be calculated as a difference between a first average of static load rolling circumferences ($R_{SL}$) of the front left and back left tires 45a, 45c and a second average of static load rolling circumferences ($R_{SL}$) of the front right and back right tires 45b, 45d to determine roll tire height corrections ($RR_{COR}$). The roll tire height corrections ($RR_{COR}$) can then be applied to the target height corrections ($R_{COR}'$) for the suspension assemblies 160 in the first summation block 244, to the extent adequate suspension height ($H_S$) remains.

Pitch is a comparison between front and back static load rolling circumferences ($R_{SL}$) of the sprayer 15. Pitch can be calculated as a difference between a first average of static load rolling circumferences ($R_{SL}$) of the front left and front tires 45a, 45b and a second average of static load rolling circumferences ($R_{SL}$) of the back left and back right tires 45c, 45d to determine pitch tire height corrections ($PR_{COR}$). The pitch tire height corrections ($PR_{COR}$) can then be applied to the target height corrections ($R_{COR}'$) for the suspension assemblies 160 in the first summation block 244, to the extent adequate suspension height ($H_S$) remains.

Machine height is a comparison between static load rolling circumferences ($R_{SL}$) of each tire 45 of the sprayer 15. An average static load rolling circumferences ($R_{SL}$) can be calculated to determine machine height tire corrections ($MHR_{COR}$). The machine height tire corrections ($MHR_{COR}$) can then be applied to the target height corrections ($R_{COR}'$) for the suspension assemblies 160 in the first summation block 244, to the extent adequate suspension height ($H_S$) remains.

Then, the target height corrections ($R_{COR}'$), with corrections for characteristics of the suspension assemblies and/or the tires 45, can be applied to the suspension heights when the piston rod 166 is completely retracted ($H_{MIN}$) in the second summation block 246 to determine the target suspension heights ($H_S'$) that are optimized for the suspension assemblies 160. From the target suspension heights ($H_S'$), and the aforementioned predetermined and derived parameters, the target strokes (S') can then be geometrically calculated for providing to a closed loop control system 260 as described above.

Closed Loop Control

Referring now to FIG. 8, the processor 233 can execute the closed loop control system 260 to control the valves 206 to flow fluid to or from the control volumes 218 to minimize an error value (E) between determined (target) values and measured values. In particular, at block 262, the processor 233 can determine target control volumes 218 (indicated by "CV'") corresponding to the target strokes (S') for the cylinders 164 and a pressure (p) indicated by a pressure sensor 220 of a control volume 218 for the cylinder 164 for ultimately producing the target strokes (S') at a steady state or equilibrium condition. Also, at block 264, the processor 233 can determine a measured amount of fluid in each control volume 218 using a position indicated by a position sensor, stroke (S), configured with respect to a cylinder 164 and a pressure (p) indicated by a pressure sensor 220 of a control volume 218 for the cylinder 164.

For example, with reference again to FIG. 5, the amount of fluid in each control volume 218 can be determined by adding a first volume of a cylinder 164 having a portion of the control volume 218 (such as the base 168 of the cylinder 164b having a first portion of the control volume 218b), a second volume of the fluid portion 212 of an accumulator 202 having a second portion the control volume 218 (such as the fluid portion 212 of the accumulator 202b having a second portion of the control volume 218b), and a third volume of a diagonally opposing cylinder 164 having a third portion of the control volume 218 (such as the piston rod 166 side of the cylinder 164c having a third portion of the control volume 218b). In most systems, the interconnecting lines between the cylinders 164, the accumulators 202 and the valves 206 may be negligible; however, an additional constant could be added to account for this volume within the scope of the invention.

The volume of the base 168 of the cylinder 164 can be readily calculated based on the dimensions of the cylinder 164 and the stroke (S) of the piston rod 166 for the measured control volume (CV) (or the stroke (S') for the target control volume (CV')). The volume of the piston rod 166 side of the cylinder 164 can be calculated based on the dimensions of the cylinder 164 and the stroke (S) of the piston rod 166, less the volume consumed by the piston rod 166 at the stroke (S), for the measured control volume (CV) (or the stroke (S') for the target control volume (CV')). The volume of the fluid portion 212 of the accumulator 202 can be indirectly calculated by first determining a volume of the gas portion 214 of the accumulator 202, then subtracting the volume of the gas portion 214 from a total volume of the accumulator 202. The volume of the gas portion 214 can be approximated using the ideal gas law: pV=nRT; where "p" is the pressure of the gas in the gas portion 214; "V" is the is the volume of the gas portion 214 to be solved; "n" is the amount of gas (in moles) in the gas portion 214; "R" is the ideal, or universal, gas constant, equal to the product of the Boltzmann constant and the Avogadro constant; and "T" is the absolute temperature of the gas. The pressure of the gas "p" in the gas portion 214 can be approximated to be equal to the pressure (p) of the control volume 218 provided by the pressor sensors 220. The amount of gas "n" can be determined in advance according to the manufacture of the accumulator 202. The temperature of the gas "T" can be fixed to a predetermined operating constant, or alternatively, can be approximated to be equal to the temperature provided by the temperature sensors 222.

With the target control volumes 218 (CV') and the measured control volumes (CV) determined, the processor 233 can then execute to compare the target control volumes 218 (CV') and the measured control volumes 218 (CV) at a closed loop summation 266 to produce error values (E) between the two sets. The error values (E) can then be applied with closed loop control 268, such as through Proportional-Integral-Derivative (PID) control, to control the valves 206 to flow fluid to or from the control volumes 218 to minimize the error values (E).

Orientation Control

The sprayer 15 can also be configured to control orientation of the chassis frame 25 with respect to the suspension assemblies 160 to prevent undesirable twist. For example, the sprayer 15 could encounter downward slopes to the left or right, or downward grades to the front or back, twisting the chassis, affecting spray operations and/or risking loss of control. The sprayer 15 can be enabled to maintain a substantially constant chassis-to-horizon orientation, preferably about 0°, using an Inertial Measurement Unit (IMU) 270, an electronic device configured to measure and report a body's specific force, angular rate and/or magnetic field surrounding the body, using a combination of accelerometers, gyroscopes and/or magnetometers. The IMU 270 can detect, for example, orientations with respect to at least two axes, including: an x-axis for detecting chassis-to-horizon slopes causing roll; and a y-axis for detecting chassis-to-horizon grades causing pitch. For example, with additional reference to FIG. 9A, the IMU 270 could detect an angle θ indicating chassis-to-horizon roll to the right (which may be caused by a downward slope to the right).

Figure 9A:
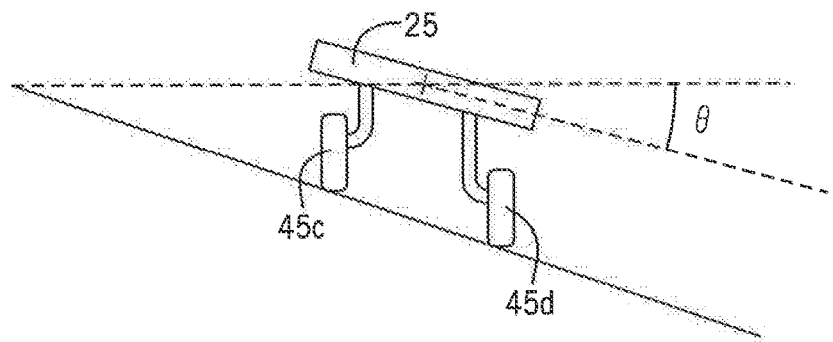
FIGS. 9A and 9B are diagrams illustrating a chassis-to-horizon angle and negating the chassis-to-horizon angle, respectively.
Figure 9B:
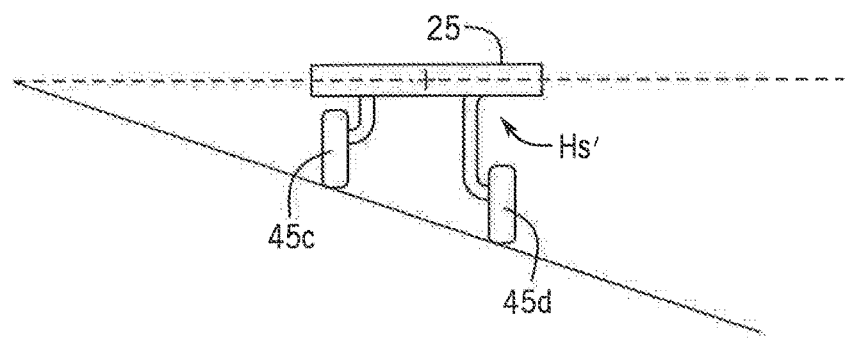

If enabled to maintain a substantially constant chassis-to-horizon orientation, and a chassis-to-horizon angle is detected, at block 272, the processor 233 can execute to apply a corresponding correction factor to the correction target to provide self-leveling. In the example of FIG. 9A, this could result in a corresponding increase in the target suspension height ($H_S'$) to the right side to substantially level the chassis frame 25, such as by the roll height corrections ($RH_{COR}$), to control the roll, such as to lessen the roll, as provided in FIG. 9. Similarly, for a detected pitch, the processor 233 could execute to apply a corresponding correction factor to the correction target to provide self-leveling, such as by the pitch height corrections ($PH_{COR}$), to control the pitch, such as to lessen the pitch.

In another aspect, whether an IMU is present or not, operator input 274 could be provided by an operator in the cab to provide desired configuration settings, such as clearance (C). A vehicle speed sensor and a turn angle sensor could provide measurements used by the processor 233 for comparison to a look-up table 278. If an output of the speed sensor and/or the turn angle sensor exceeds a threshold, the processor 233 can execute to apply pitch height corrections ($PH_{COR}$) and/or roll height corrections ($RH_{COR}$) to control pitch and/or roll to a desired target, which could be set to lessen the pitch and/or roll. In one aspect, the lookup table 278 could drive for overcompensation (past zero) of the suspension to counter "wind-up" between the chassis frame 25 and the spray boom 17.

Alternative Suspension System

Figure 10:
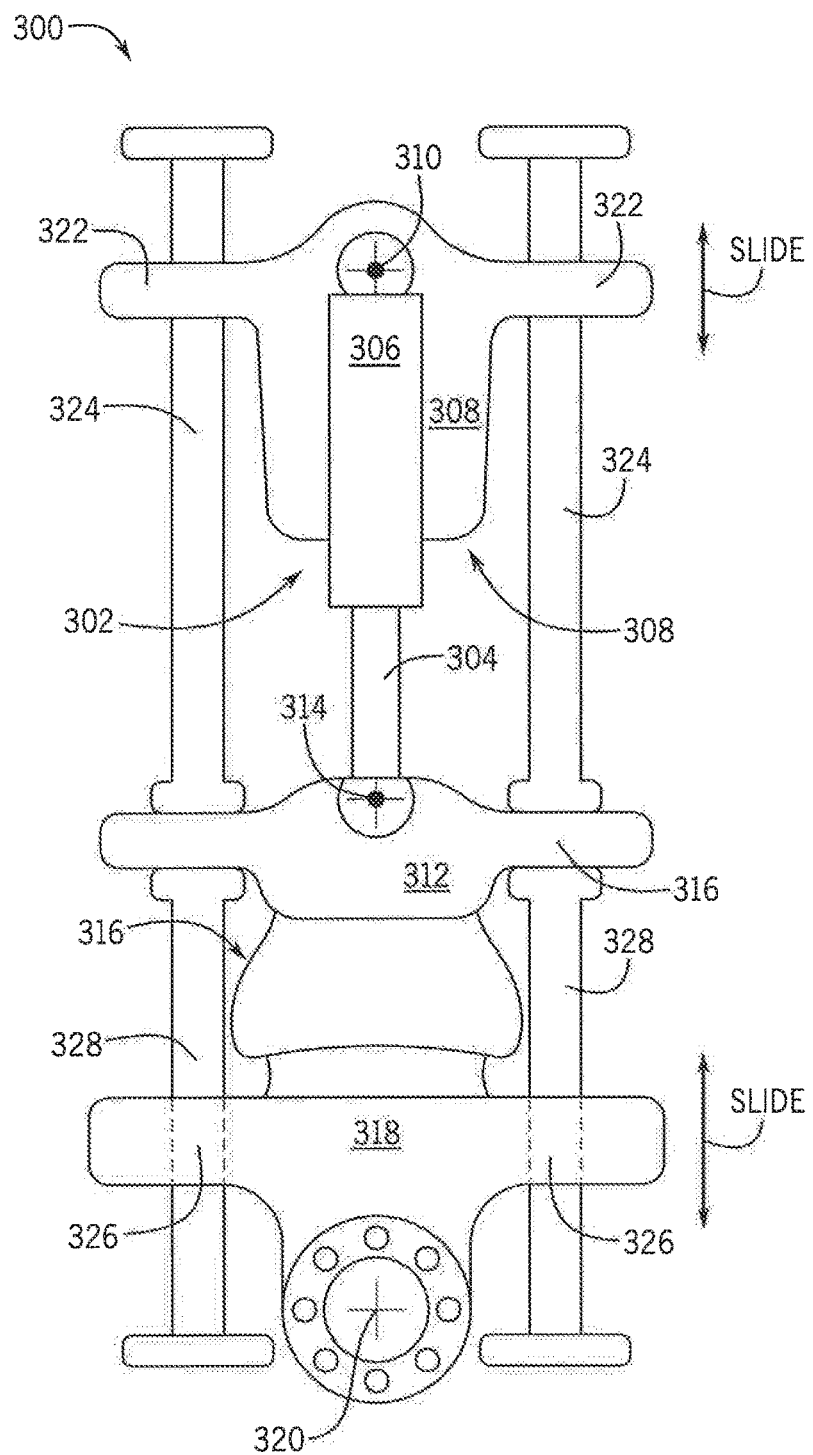
FIG. 10 is a simplified diagrammatic view of an alternative suspension assembly in accordance with an aspect of the invention.

It should be appreciated that various aspects of the invention could also apply to alternative suspension systems. For example, with additional reference to FIG. 10, an alternative suspension system 300 could be implemented on the sprayer 15. The suspension system 300 could include a cylinder 302, like the cylinder 164. The cylinder 302 could be a single or dual action cylinder that is responsive to a fluid in a control volume, such as an oil (hydraulic) or gas (pneumatic). Also, the cylinder 302 can include a piston rod 304 configured to extend and retract with respect to a base 306. The cylinder 302 could be operationally coupled to an upper-support assembly 308, operating as a swing frame assembly, at an actuation point 310, like the actuation point 176, which could be on a relative corner of the chassis 20. The cylinder 302 could also be operationally coupled to a mid-support assembly 312 at a cylinder point 314, like the cylinder point 174. The suspension system 300 could also include a pneumatic air bag 316 to absorb bumps. The air bag 316 could be operationally coupled the mid-support assembly 312, mounted below. The air bag 316 could also be operationally coupled to a lower-support assembly 318. The lower-support assembly 318 could include a hub point 320, like the hub point 172, for mounting the wheel 44 (or multiple wheels, including for driving a continuous band of treads or track plates). This arrangement allows action of the cylinder 302 at the actuation point 310 to cause the upper-support assembly 308 to slide up and down at the slide points 322, along upper slidable guides 324 mounted to a upper side the mid-support assembly 312, between the mid-support assembly 312 and the chassis 20. This arrangement also allows action of the air bag 316 to cause the lower-support assembly 318 to slide up and down at the slide points 326, along lower slidable guides 328 mounted to a lower side the mid-support assembly 312. In one aspect, the base 306 of each cylinder can be operationally coupled at the actuation point 310, and the piston rod 166 of each cylinder can be operationally coupled at the cylinder point 314, as shown in FIG. 10. However, in another aspect, the base 168 of each cylinder can be operationally coupled at the cylinder point 314, and the piston rod 166 of each cylinder can be operationally coupled at the actuation point 310. The cylinder 302 and the air bag 316 can allow setting the suspension system 300 to an adjustable predetermined clearance (C), as determined by the operator, providing an overall height of the sprayer 15. The suspension control system 230 (FIG. 6) could be applied with respect to the cylinder 306 to allow following more rugged terrain than may be provided by the bag 316.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

What is claimed is:

1. A suspension system for an agricultural machine, comprising:
   a plurality of suspension assemblies, each suspension assembly comprising a swing frame assembly and a cylinder, each cylinder comprising a piston rod configured to extend and retract with respect to a base, wherein the swing frame assembly is coupled to the agricultural machine, and wherein the cylinder is operationally coupled to the swing frame assembly at an actuation point;
   a plurality of position sensors, each position sensor being configured with respect to a cylinder, wherein each position sensor is configured to generate a signal indicating a position of a piston rod with respect to a base;
   a plurality of electronically controlled valves, each electronically controlled valve being configured to control a flow of fluid to and from a control volume for operating a cylinder;
   a vehicle sensor configured to provide an output, the vehicle sensor being selected from a group consisting of: a speed sensor configured to provide an output indicating a speed of the agricultural machine, and a turn angle sensor configured to provide an output indicating a turn angle of the agricultural machine; and
   a processor in communication with the plurality of position sensors, the plurality of electronically controlled valves, and the vehicle sensor, the processor executing a program stored in a non-transient medium to:
   determine a height for each suspension assembly from a position indicated by a position sensor configured with respect to a cylinder of the suspension assembly;
   calculate at least one of pitch and roll of the agricultural machine to determine a height correction for each suspension assembly, wherein pitch is a comparison between front and back heights of the agricultural machine, and roll is a comparison between left side and right side heights of the agricultural machine;
   compare the output of the vehicle sensor to a threshold; and
   control the electronically controlled valves to change the control volumes to apply the height corrections when the output exceeds the threshold.

2. The suspension system of claim 1, wherein pitch and roll are calculated to determine a pitch height correction and a roll height correction for each suspension assembly, respectively, and wherein the height correction for each suspension assembly comprises a summation of the pitch height correction and the roll height correction.

3. The suspension system of claim 1, wherein the plurality of suspension assemblies consists of a front left suspension assembly, a front right suspension assembly, a back left suspension assembly and a back right suspension assembly.

4. The suspension system of claim 3, wherein pitch is a difference between an average of heights of the front left and front right suspension assemblies and an average of heights of the back left and back right suspension assemblies, and roll is a difference between an average of heights of the front left and back left suspension assemblies and an average of heights of the front right and back right suspension assemblies.

5. The suspension system of claim 1, wherein the electronically controlled valves are controlled to lessen a pitch or roll.

6. The suspension system of claim 1, further comprising an Inertial Measurement Unit (IMU) configured to detect a chassis-to-horizon angle.

7. The suspension system of claim 6, wherein the processor further executes to control the valves to control the chassis-to-horizon angle.

8. The suspension system of claim 1, wherein the electronically controlled valves are controlled in closed loop Proportional-Integral-Derivative (PID) control systems.

9. An agricultural sprayer comprising:
   a chassis supported by front left, front right, back left and back right suspension assemblies, each suspension assembly comprising a swing frame assembly and a hydraulic cylinder, each hydraulic cylinder comprising a piston rod configured to extend and retract with respect to a base, wherein the swing frame assembly is coupled to the sprayer at a pivot point and is coupled to a wheel at a hub point, and wherein the hydraulic cylinder is operationally coupled to the sprayer at a cylinder point and is also operationally coupled to the swing frame assembly at an actuation point distal from the pivot point such that action of the hydraulic cylinder at the actuation point causes the swing frame assembly to pivot at the pivot point;
   a plurality of tires, each tire being mounted to a wheel;
   a sprayer boom extending transversely relative to the chassis;
   a plurality of position sensors, each position sensor being configured with respect to a hydraulic cylinder, wherein each position sensor is configured to generate a signal indicating a position of a piston rod with respect to a base;
   a plurality of electronically controlled valves, each electronically controlled valve being configured to control a flow of hydraulic fluid to and from a control volume for operating a hydraulic cylinder; and
   a vehicle sensor configured to provide an output, the vehicle sensor being selected from a group consisting of: a speed sensor configured to provide an output indicating a speed of the sprayer, and a turn angle sensor configured to provide an output indicating a turn angle of the sprayer; and a processor in communication with the plurality of position sensors, the plurality of electronically controlled valves, and the vehicle sensor, the processor executing a program stored in a non-transient medium to:

determine a height for each suspension assembly from a position indicated by a position sensor configured with respect to a hydraulic cylinder of the suspension assembly;

calculate at least one of pitch and roll of the sprayer to determine a height correction for each suspension assembly, wherein pitch is a difference between an average of heights of the front left and front right suspension assemblies and an average of heights of the back left and back right suspension assemblies, and roll is a difference between an average of heights of the front left and back left suspension assemblies and an average of heights of the front right and back right suspension assemblies;

compare the output of the vehicle sensor to a threshold; and control the electronically controlled valves to change the control volumes to apply the height corrections when the output exceeds the threshold.

10. The sprayer of claim 9, wherein pitch and roll are calculated to determine a pitch height correction and a roll height correction for each suspension assembly, respectively, and wherein the height correction for each suspension assembly comprises a summation of the pitch height correction and the roll height correction.

11. The sprayer of claim 9, wherein pitch is a difference between an average of heights of the front left and front right suspension assemblies and an average of heights of the back left and back right suspension assemblies, and roll is a difference between an average of heights of the front left and back left suspension assemblies and an average of heights of the front right and back right suspension assemblies.

12. The sprayer of claim 9, wherein the electronically controlled valves are controlled to lessen a pitch or roll.

13. The sprayer of claim 9, further comprising an Inertial Measurement Unit (IMU) configured to detect a chassis-to-horizon angle.

14. The sprayer of claim 13, wherein the processor further executes to control the valves to control the chassis-to-horizon angle.

15. The sprayer of claim 9, wherein the electronically controlled valves are controlled in closed loop Proportional-Integral-Derivative (PID) control systems.

16. A suspension system for an agricultural machine, comprising:

a plurality of suspension assemblies, each suspension assembly comprising a swing frame assembly and a cylinder, each cylinder comprising a piston rod configured to extend and retract with respect to a base, wherein the swing frame assembly is coupled to the agricultural machine, and wherein the cylinder is operationally coupled to the swing frame assembly at an actuation point;

a plurality of position sensors, each position sensor being configured with respect to a cylinder, wherein each position sensor is configured to generate a signal indicating a position of a piston rod with respect to a base;

a plurality of electronically controlled valves, each electronically controlled valve being configured to control a flow of fluid to and from a control volume for operating a cylinder;

an Inertial Measurement Unit (IMU) configured to detect a chassis-to-horizon angle; and a processor in communication with the plurality of position sensors, the plurality of electronically controlled valves, and the IMU, the processor executing a program stored in a non-transient medium to:

determine a height for each suspension assembly from a position indicated by a position sensor configured with respect to a cylinder of the suspension assembly;

calculate at least one of pitch and roll of the agricultural machine to determine a height correction for each suspension assembly, wherein pitch is a comparison between front and back heights of the agricultural machine, and roll is a comparison between left side and right side heights of the agricultural machine;

compare an output of the IMU to a threshold; and control the electronically controlled valves to change the control volumes to apply the height corrections when the output of the IMU exceeds the threshold.

17. The suspension system of claim 16, wherein the electronically controlled valves are controlled to maintain a substantially constant chassis-to-horizon orientation.

18. The suspension system of claim 16, wherein the electronically controlled valves are controlled to lessen a pitch or roll.

19. The suspension system of claim 16, wherein the threshold is a first threshold, and further comprising a vehicle sensor configured to provide an output, the vehicle sensor being selected from a group consisting of: a speed sensor configured to provide an output indicating a speed of the agricultural machine, and a turn angle sensor configured to provide an output indicating a turn angle of the agricultural machine, wherein the processor further executes to:

compare the output of the vehicle sensor to a second threshold; and control the electronically controlled valves to change the control volumes to apply the height corrections when the output exceeds the second threshold.

20. The suspension system of claim 16, wherein the electronically controlled valves are controlled in closed loop Proportional-Integral-Derivative (PID) control systems.

* * * * *